United States Patent Office 3,738,942
Patented June 12, 1973

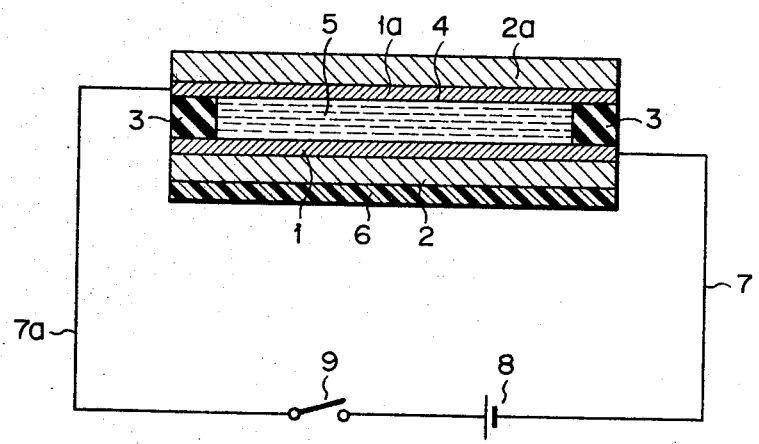

3,738,942
LIQUID CRYSTAL MATERIAL
Shoichi Matsumoto, Yokohama, and Masahiro Kawamoto, Kamakura, Japan, assignors to Tokyo Shibaura Electric Co., Ltd., Kawasaki-shi, Japan
Filed Aug. 31, 1971, Ser. No. 176,472
Claims priority, application Japan, Sept. 9, 1970, 45/78,453
Int. Cl. G01n 31/00
U.S. Cl. 252—408                9 Claims

ABSTRACT OF THE DISCLOSURE

A mixed nematic liquid crystal material prepared by mixing p-[N-(p-methoxy benzylidene)amino]phenyl 2-ethyl hexanoate with one or more liquid crystal materials such as a fatty acid ester of p-[N-(p-alkoxy benzylidene) amino]phenol, alkyl p-(p-alkoxy phenoxy carbonyl)phenyl carbonate, or p-[N-(p-alkoxy benzylidene)amino]-n-alkyl benzene.

BACKGROUND OF THE INVENTION

This invention relates to a liquid crystal material for electro-optical application and more particularly to a mixed nematic liquid crystal material containing at elast p-[N-(p-methoxy benzylidene)amino]phenyl 2-ethyl hexanoate.

A film formed of a general nematic liquid crystal material and bearing a neumatic phase intermediate between solid and liquid phases is essentially transparent. However, when the film is impressed with an electric field having a higher intensity than a certain level, the affected portion of the film presents a light scattering property and becomes opaque. Therefore when there is projected light on a film made of such liquid crystal material while it is impressed with an electric field and the film is observed from the side of a light source, that portion of the film to which there is applied the electric field grows bright due to the reflection of scattered light and the other portion which is not impressed with the electric field looks dark. Conversely, when observation is made on the opposite side to the light source, the portion of the film impressed with the electric field looks dark due to its reduced light transmittance by light scattering, whereas the other portion free from the electric field grows bright due to most of the projected light being allowed to pass therethrough. At present, attention is being paid to the possibility of utilizing for electro-optical apparatus the light scattering phenomenon (electro-optical effect) which takes place when there is impressed an electric field on a film composed of the aforementioned nematic liquid crystal material and bearing and a nematic phase intermediate between solid and liquid phases. Thus, a great deal of interest is concentrated on the development of electro-optical apparatus such as a panel display of light-reflecting or light transmitting type, light switches, or light valve devices through utilization of the aforementioned light scatering phenomenon.

However, the known or readily available nematic liquid crystal materials, such as p-[N-(p-methoxy benzylidene) amino]phenyl acetate and butyl p-(p-ethoxy phenoxy carbonyl)phenyl carbonate, present a nematic phase intermediate between solid and liquid phases only when they are heated at far higher temperatures than room temperature such as 83° to 102° C. or 55° to 87° C. Since these nematic liquid crystal materials indicate exhibit the aforesaid light scattering property (electro-optical effect) only when they present the nematic phase, they have the drawback that they always have to be maintained at high temperatures such as 83° to 102° C. or 55° to 87° C. in practical application. Accordingly, electro-optical apparatus using such liquid crystal materials has to be provided with an adequate means for heating said materials, resulting in the complicated construction and difficult handling of the appartus. Therefore, there is a need for the development of such a liquid crystal material as can present a nematic phase over a wide temperature range around room temperature.

SUMMARY OF THE INVENTION

This invention has been accomplished in view of the aforementioned circumstances and is intended to provide a liquid crystal material which, when impressed with the prescribed electric field, presents a light scattering phenomenon over a wide range of temperatures around room temperature, and is particularly adapted for use with electro-optical apparatus such as a panel display, light switch and light valve device.

The liquid crystal material of this invention comprises a mixed liquid crystal composition prepared by mixing at least one nematic liquid crystal material with p-[N-(p-methoxy benzylidene)amino]phenyl 2-ethyl hexanoate.

The liquid crystal materials prepared by mixing the abovementioned constituents has a low transition temperature at which it changes from solid phase to nematic phase intermediate between solid and liquid phases and displays the desired electro-optical effect around room temperature. Therefore, an electro-optical device using said liquid crystal material need not be provided with heating or heat controlling means, offering many practical advantages due to its simple construction and freedom from handling difficulties.

BRIEF DESCRIPTION OF THE DRAWING

The appended drawing is a schematic sectional view of a simple panel display using the liquid crystal material of this invention.

DETAILED DESCRIPTION OF THE INVENTION

The mixed nematic liquid crystal composition of this invention contains at least p-[N-(p-methoxy benzylidene) amino]phenyl 2-ethyl hexanoate. This component may be expressed by the following structural formula:

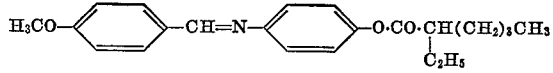

and prepared, for example, in the following manner. To a benzene solution containing 1 mol of pyridine is added 1 mol of 2-ethyl hexanoic acid chloride and further 1 mol of 2-ethyl hexanoic acid while the mixture is cooled. The mixture is stirred about one hour at room temperature to promote reaction. By ether extraction of the reaction system, the resultant 2-ethyl hexanoic anhydride is extracted, and distilled for purification. 1 mol of said purified anhyrdride is added to a pyridine solution at 0° C. including 1 mol of p-[N-(p-methoxy benzylidene)amino]phenol, followed by stirring for about one hour. Upon completion of said stirring, there is added cold water to the reaction system to precipitate crude crystals. Said crude crystals are dissolved in a mixed solvent consisting of ether and petroleum ether, and cooled for recrystallization by a coolant consisting of Dry Ice and methanol, obtaining purified p-[N-(p-methoxy benzylidene)amino]phenyl 2-ethyl hexanoate. This compound is formed of colorless crystals and has a melting point of 40° C., while it does not present the properties of a nematic liquid crystal by itself.

To prepare a liquid crystal material according to this invention, for example, there are weighed out the prescribed proportions of the aforementioned p-[N-(p-methoxy benzylidene)amino] phenyl 2-ethyl hexanoate and one or more nematic liquid crystal compounds, followed by thorough mixing. The mixture is heated up to the temperature at which it is all converted to an isotropic liquid. This liquid is fully stirred under the isotropic liquid state to obtain a liquid crystal material presenting a nematic phase over a wide range of temperatures around room temperature, though said temperatures may vary with the kinds of components used and their selected proportions.

The nematic compounds mixed with the aforesaid p-[N-(p-methoxy benzylidene) amino] phenyl 2-ethyl hexanoate according to this invention include:

(1) Fatty acid esters of p-[N-(p-alkoxy benzylidene) amino] phenol expressed by the general formula:

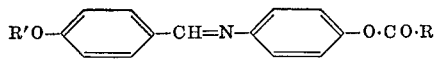

where:

O·CO·R = residual group of a fatty acid
R' = alkyl group such as a fatty acid ester of p-[N-(p-methoxy benzylidene) amino] phenol, a fatty acid ester of p-[N-(p - ethoxy benzylidene) amino] phenol, a fatty acid ester of p-[N-(p-propoxy benzylidene) amino] phenol and a fatty acid ester of p[N-(p-butoxy benzylidene) amino] phenol (the fatty acid esters used herein include, for example, acetate, propionate, butyrate, valerate, hexanoate, acrylate, crotonate) and (2) Alkyl p-(p-alkoxy phenoxy carbonyl) phenyl carbonate expressed by the general formula:

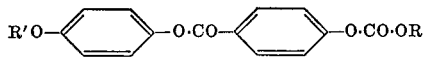

where:

R and R' = alkyl groups such as alkyl p-(p-methoxy phenoxy carbonyl) phenyl carbonate, alkyl p-(p-ethoxy phenoxy carbonyl) phenyl carbonate, alkyl p-(p-propoxy phenoxy carbonyl) phenyl and alkyl p-(p-butoxy phenoxy carbonyl) phenyl carbonate (the alkyl groups used herein include, for example, methyl, ethyl, propyl butyl and pentyl groups).

(3) p-[N - (p - alkoxy benzylidene) amino]-n-alkyl benzene expressed by the general formula:

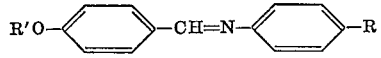

where:

R and R' = alkyl groups such as p-[N-(p-methoxy benzylidene) amino]-n-alkyl benzene, p - [N-(p-ethoxy benzylidene) amino]-n-alkyl benzene, p-[N-(p-propoxy benzylidene) amino]-n-alkyl benzene and p-[N-(p - butoxy benzylidene) amino]-n-alkyl benzene (the alkyl groups used herein include, for example, propyl, butyl, pentyl, and hexyl groups).

The above-mentioned nematic compounds (1), (2) and (3) may be used alone or in combination.

The liquid crystal material of this invention prepared by mixing p-[N-(p-methoxy benzylidene) amino] phenyl 2-ethyl hexanoate with the nematic compounds used as liquid crystal materials presents a nematic phase over a wide range of temperatures around room temperature. For example, a liquid crystal composition prepared according to this invention by mixing about 20 percent by weight of the aforesaid p-[N-(p-methoxy benzylidene) amino] phenyl 2-ethyl hexanoate with a liquid crystal material of butyl p-(p-ethoxy phenoxy carbonyl) phenyl carbonate displays a nematic phase at temperatures of 23 to 60° C., though the latter liquid crystal material, when used singly, presents a nematic phase at 55 to 87° C. Thus this invention enables the resultant liquid crystal composition to show a nematic phase at temperatures about 30° C. lower than in the prior art, that is, at temperatures approaching room temperature.

This invention will be more fully understood by reference to the following example.

EXAMPLE 1

There was prepared a liquid crystal composition from raw materials consisting of butyl p-(p-ethoxy phenoxy carbonyl) phenyl carbonate (abbreviated as BEPCPC), p - [N - (p - methoxy benzylidene) amino] phenyl 2-ethyl hexanoate (abbreviated as MBAPH, p-[N-(p-methoxy benzylidene) amino] phenyl butyrate (abbreviated as MBAPB), p-[N-(p-methoxy benzylidene) amino] phenyl acetate (abbreviated as MBAPA), and p-[N-(p-methoxy benzylidene) amino]-n-butyl benzene (abbreviated as MBABB) in the proportions given in the following Table 1.

TABLE 1

| | Proportion (parts by weight) of— | | | | | Temperature (° C.) range of nematic phase |
| --- | --- | --- | --- | --- | --- | --- |
| | BEPCPC | MBAPH | MBAPB | MBAPA | MBABB | |
| Sample No.: | | | | | | |
| 1 | 80.6 | 19.4 | | | | 23–60 |
| 2 | | 19.1 | 80.9 | | | 21–67 |
| 3 | 36.1 | 27.1 | 36.8 | | | 3–42 |
| 4 | 25.2 | 10.8 | 48.8 | 15.2 | | −9–78 |
| 5 | | 10.1 | | | 89.9 | 10–31 |
| 6 | | 19.6 | | | 80.4 | −1–13 |
| Control No.: | | | | | | |
| a | 80.6 | 0 | | | | 55–87 |
| b | | 0 | 80.9 | | | 52–114 |
| c | 36.1 | 0 | 36.8 | | | 32–98 |
| d | 25.2 | 0 | 48.8 | 15.2 | | 15–96 |
| e | | 0 | | | 89.9 | 21–41 |
| f | | 0 | | | 80.4 | 21–41 |

The weighed out raw materials were crushed and well mixed, followed by heating until the mixture was converted to an isotropic liquid. Said liquid was further stirred under the isotropic liquid state to obtain a liquid crystal material. Determination was made of the temperatures at which the liquid crystal material thus prepared presented the nematic phase, the results being given in Table 1 above. By way of comparison, similar determination was made on the controls, the results being also shown in Table 1. Said determination was carried out in the following manner. The samples of a liquid crystal material converted to the above-mentioned isotropic liquid were fully cooled for solidification in a freezer. Thereafter there were observed the changing phases which said liquid crystal samples indicated during the heating process, using a microscopic melting-point measuring apparatus. Thus there were defined the transition temperatures at which the phase of the samples changed from solid to nematic and from nematic to isotropic liquid.

As apparent from Table 1 above, the mixed nematic liquid crystal composition of this invention containing p-[N-(p-methoxy benzylidene) amino] phenyl 2-ethyl hexanoate exhibits a nematic phase at far lower temperatures than a liquid crystal material prepared from the components alone. Namely, when impressed with an electric field, the nematic phase of the liquid crystal composition of this invention readily presents a light scattering phenomenon over a wide range of temperatures around room temperature.

There will now be described a simple panel display using the aforementioned liquid crystal material. Referring to drawing, there were provided in a mutually facing relationship a glass plate 2 fully coated on one side with a transparent electrode layer 1 and on the opposite side with a black coating 6 and another glass plate 2a, on one side of which there was mounted a transparent electrode layer 1a in the form of a desired indication pattern, said electrode layers 1 and 1a being also disposed to face each other. Between the glass plates 2 and 2a was disposed an annular spacer 3 about 25 microns thick to constitute a liquid tight vessel 4 together with said glass plates 2 and 2a. In said vessel 4 was received each of the samples 5 of the aforesaid mixed liquid crystal material to constitute a panel display. Referring to drawing, numerals 7 and 7a denote lead wires connected to the electrode layers 1 and 1a, 8 a source of power and 9 a switch. Examination of the performance of a light reflecting type panel display of the aforesaid construction using each of the above-mentioned liquid crystal materials showed that the liquid crystal material included therein exhibited an excellent display property over a wide range of temperatures at which it has a nematic phase.

When there was impressed across the electrode layers 1 and 1a a prescribed voltage of, for example, 50 v. while projecting light from the side of the glass plate 2a of the display which was not provided with the black coating 6, then that portion of the mixed nematic liquid crystal 5 which faced the transparent electrode 1a bearing the prescribed pattern grew bright due to the scattering of light caused by the electro-optical effect, whereas the other portion of the liquid crystal material remained dark. In every test, the panel display distinctly presented bright and dark patterns, showing that it had a good display property. Further, the scattering of light resulting from the impression of an electric field distinguished the bright and dark portions of the liquid crystal material in distinct contrast. For example, where there was applied voltage of, for example, 50 v., the contrast ratio between the brightness of the bright portion and that of the dark portion was about 35 to 1. Further, the response time required for the scattering of light to reach a saturated condition after application of an electric field was several milliseconds based on the impressed voltage of 50 v. and the decay time required for the scattering of light to cease after the interruption of an applied voltage was scores of milliseconds on the same basis. These values prove that the panel display using the liquid crystal material of this invention had excellent properties.

As apparent from the foregoing description, the liquid crystal material of this invention presents the excellent light scattering property (electro-optical effect) over a wide range of temperatures around room temperature and eliminates the necessity of using any heating means in practical application, so that it is well adapted for use with electro-optical apparatus.

What we claim is:

1. A liquid crystal material comprising a mixed liquid crystal composition prepared by mixing at least one nematic liquid crystal material with p-[N-(p-methoxy benzylidene) amino] phenyl 2-ethyl hexanoate.

2. A liquid crystal material comprising a mixed liquid crystal composition prepared by mixing p-[N-(p-methoxy benzylidene) amino] phenyl 2-ethyl hexanoate with at least one nematic liquid crystal material selected from the group consisting of (a) a fatty acid ester of p-[N-(p-alkoxy benzylidene) amino] phenol,
(b) alkyl p-(p-alkoxy phenoxy carbonyl) phenyl carbonate, and
(c) p-[p-alkoxy benzylidene) amino]-n-alkyl benzene.

3. The liquid crystal material according to claim 2 wherein the fatty acid ester of p[N-(p-alkoxy benzylidene) amino] phenol is selected from the group consisting of a fatty acid ester of p-[N-(p-methoxy benzylidene) amino] phenol, a fatty acid ester of p-[N-(p-ethoxy benzylidene) amino] phenol, a fatty acid ester of p-[N-(p-propoxy benzylidene) amino] phenol and a fatty acid ester of p-[N-(p-butoxy benzylidene) amino] phenol.

4. The liquid crystal material according to claim 2 wherein the alkyl p-(p-alkoxy phenoxy carbonyl) phenyl carbonate is selected from the group consisting of alkyl p-(p-methoxy phenoxy carbonyl) phenyl carbonate, alkyl p-(p-ethoxy phenoxy carbonyl) phenyl carbonate, alkyl p-(p-propoxy phenoxy carbonyl) phenyl carbonate and alkyl p-(p-butoxy phenoxy carbonyl) phenyl carbonate.

5. The liquid crystal material according to claim 2 wherein the p-[N-(p-alkoxy benzylidene) amino]-n-alkyl benzene is selected from the group consisting of p-[N-(p-methoxy benzylidene) amino]-n-alkyl benzene, p-[N-(p-ethoxy benzylidene) amino]-n-alkyl benzene, p-[N-(p-propoxy benzylidene) amino]-n-alkyl benzene and p-[N-(p-butoxy benzylidene) amino]-n-alkyl benzene.

6. The liquid crystal material according to claim 3 wherein the fatty acid ester is selected from the group consisting of acetate, propionate, butyrate, valerate, hexanoate, acrylate and crotonate.

7. The liquid crystal material according to claim 4 wherein the alkyl radical is selected from the group consisting of methyl radical, ethyl radical, propyl radical, butyl and pentyl radical.

8. The liquid crystal material according to claim 5 wherein the alkyl radical is selected from the group consisting of propyl radical, butyl radical, pentyl radical and hexyl radical.

9. The liquid crystal material according to claim 2 wherein at least one nematic liquid crystal material is selected from the group consisting of p-[N-(p-methoxy benzylidene) amino] phenyl butyrate alone, butyl p-(p-ethoxy phenoxy carbonyl) phenyl carbonate alone, p-[N-(p-methoxy benzylidene) amino]-n-butyl benzene alone, a mixture of p-[N-(p-methoxy benzylidene) amino] phenyl butyrate and butyl p-(p-ethoxy phenoxy carbonyl) phenyl carbonate, and a mixture of p-[N-(p-methoxy benzylidene) amino] phenyl butyrate, p-[N-(p-methoxy benzylidene) amino] phenyl acetate and butyl p-(p-ethoxy phenoxy carbonyl) phenyl carbonate.

References Cited

FOREIGN PATENTS 1,170,486   11/1969   Great Britain _____ 257—408

OTHER REFERENCES

V. A. Usolitseva et al.: "Chemical Characteristics Structure, and Properties of Liquid Crystal," Russian Chemical Review, pp. 495–507 (September 1963).

Science Sec., Chem. & Eng. News, pp. 20–3 (November 1971), "Liquid Crystals Draw Intense Interest."

CHARLES E. VAN HORN, Primary Examiner

M. B. WITTENBERG, Assistant Examiner

U.S. Cl. X.R.

23—230 LL; 350—160 LL, 150; 260—479